March 4, 1969  L. A. RICHARDS  3,430,486

MEMBRANE-SHIELD FOR SOIL HYGROMETER

Filed July 31, 1967

INVENTOR
LORENZO A. RICHARDS

United States Patent Office 3,430,486
Patented Mar. 4, 1969

3,430,486
MEMBRANE-SHIELD FOR SOIL HYGROMETER
Lorenzo A. Richards, P.O. Box 424,
Riverside, Calif. 92502
Filed July 31, 1967, Ser. No. 657,293
U.S. Cl. 73—73  6 Claims
Int. Cl. G01n 25/56

ABSTRACT OF THE DISCLOSURE

An enclosure whose wall acts as a membrane and a shield, within which hygrometers can be buried in field soil for accurately measuring the relative water-vapor pressure depression in the soil immediately exterior to the membrane-shield.

Background of the invention

This invention relates to means for accurately measuring the relative humidity in soil in place in the field. This can be done with conventional types of electrical hygrometers if they are enclosed in a special membrane-shield to provide protection from damage and contamination while at the same time maintaining the humidity sensor in an atmosphere that is closely representative of the surrounding soil. The invention provides long needed apparatus for measuring the thermodynamic condition or energy status of soil water as it relates to the growth and yield of crops. Furthermore, the method is general in its applicability to all climates, soils and crops, including the full range of drouth and salinity conditions under which crops can grow.

The U.S. Weather Bureau was organized in the U.S. Department of Agriculture before the turn of the century to supply information of use to farmers. One of the original objectives was to collect from the important agricultural areas of the country information on soil moisture for guiding farmers in management operations and for expediting crop yield forecasts. This objective was progressively abandoned, however, as it became clear that more information on the relation of soil water to crop yield was needed, and that better methods for evaluating the condition of water in soil would have to be developed.

The idea that the energy status of soil water is related to crop yields has long been attractive, but theories concerning natural phenomena are like tussocks in a wet meadow. Whether they comprise bases for progress can only be known through experience and proper measurements. Some data are available that support the energy-status idea, but the evidence is sketchy and indirect because convenient and reliable instruments have not been available for implacement in the root zone under plant growth conditions where soil-water energy status must be appraised along with the other important properties and conditions of the environment.

Since the early Weather Bureau efforts, much has been learned about the physics of soil water. This is still a fairly new and specialized branch of science and the terminology is not yet stabilized. The following brief review relating to nomenclature, mechanisms, principles and pertinent references to the scientific literature is inserted here to aid in evaluating existing instruments and in establishing the novelty and importance of my invention.

A few grams of dry soil can have as much surface area as a smooth geometrical surface as large as a football field. Therefore soil water can exist mainly as a thin film under the direct influence of forces that reach out from the surface of the solid phase, which is often currently referred to as the soil matrix. Dissolved material (solute) also contributes an attractive force action on soil water. The energy status of water in soil can be expressed in terms of these two force actions, which can now be measured separately or in combination, in the laboratory by means of the pressure-membrane apparatus (U.S. Pat. 2,353,760, L. A Richards, 1944) and the thermocouple psychrometer. (L. A. Richards and G. Ogata, Science 128: 1089–1090 (1958).)

Monograph No. 2 of the American Society of Agronomy, entitled "Soil Physical Conditions and Plant Growth" was published in 1952. The largest section of this monograph, entitled "Soil Water and Plant Growth" by L. A. Richards and C. H. Wadleigh, dispelled much erroneous lore and controversy relating to this subject and subsequent reviews have largely supported the views presented in this monograph section.

Monograph No. 9 of the American Society of Agronomy entitled "Methods of Soil Analysis" fills two large volumes and was published in 1965. Chapter 8 in Part I entitled "Physical Condition of Water in Soil" by L. A. Richards describes membrane and vapor methods of measuring the energy status of water in soil and discusses soil water mechanisms and principles involved.

It seems likely that under the water condition where the roots of most crops thrive, the liquid phase of soil water lies within the range of matric force action. The thinner the film, as under drouth conditions, the more strongly water is adsorbed by the soil matrix and the lower is aqueous vapor pressure at the air-water interface between the gaseous and liquid phases in soil. Similarly there is direct attractive force action between dissolved material, solute, and the water in the liquid films on the soil. This force action is additive to that of the matrix and both contribute to vapor pressure depression.

The term "suction" and "osmotic pressure" appeared early in the plant literature. The term "suction" is also commonly used in soil science because the two classes of forces mentioned above are attractive or adsorptive in sense and in effect produce a suction in the soil system that plant roots must overcome to obtain needed water for growth. The terms matric suction, solute suction and for their sum, total suction, were used in Chapter 8 of Monograph 9 to which the reader is referred for explanation and definitions. Older corresponding terms are soil-moisture tension, osmotic pressure and total stress. The term osmotic pressure is widely used, but it violates the mores of physics and engineering in which subject matter fields solvent transport proceeds from higher to lower pressure.

While the foregoing suction quantities are expressed in pressure units, they relate to the energy status of water molecules in force fields and are of the nature of energy potentials, which also can be expressed in pressure units if we define these potentials in terms of work per unit volume.

The relative partial molar free energy, $\bar{F}-F°$, of water in soils and solutions is given by the equation $\bar{F}-F°=RT \ln (p/p_0)$, where R is the gas constant, T is Kelvin temperature and $p/p_0$ is the relative humidity in the adjacent gas phase. This function has other names, including chemical potential, and more recently in agriculture the water potential. Vapor measurements indicate total water binding and do not distinguish between matric force and solute force contributions. The distinction between these two can be made with membrane apparatus and under non-saline conditions separate information on matric suction can be useful, but for a general method of measuring total suction under field conditions, an instrument responding to vapor pressure depression provides a soil water measurement that may be simply and generally related to crop growth and this measurement is made possible under field conditions by my invention.

Early measurement with membrane apparatus (L. A. Richards and L. R. Weaver, Jour. of Agr. Res. 69: 215–235 (1944)) indicate the matric suction range over which crop plants can grow in non-saline soil is approximately 15 bars. The effect of soil salinity on plant growth is quite complicated, considering all the toxicities and nutritional imbalances produced in certain crops by excesses of certain ions in the soil. However, present data indicate there always exists a growth retardation associated with total concentration of the soil solution and this is related to solute suction (osmotic pressure). Also, present data indicate that matric suction may be equivalent to solute suction in this regard and that the net or sum retardation of growth may be simply related to total suction.

My invention makes possible the use of hygrometers for repeated non-destructive measurement of total suction in the root zone of crops so that the relation of this variable to plant growth in the field will be better understood and then, through the rational use of instruments, this information can be applied for increasing the efficiency and volume of world food production.

At present, the only two types of commercially available instruments that are used for relating soil water condition in the field to the growth of crops are soil-moisture tensiometers and water-sensitive resistors.

The soil-moisture tensiometer is a vacuum-membrane device which I helped to transform from a laboratory vexation to a practical field instrument (U.S. Patent 2,023,490, L. A. Richards (1935), L. A. Richards, Soil Science 53: 241–248 (1942), U.S. Patent 3,049,914, L. A. Richards (1962)). It consists of a ceramic membrane usually in the form of a cup that is attached to a vacuum tight water filled system containing a vacuum gage. The ceramic cup should have for soil solution the highest possible permeability that is compatible with the condition that when wet the bubbling pressure of the cup to air must be greater than one bar. Bubbling pressure is a practical measure of the size of the largest pores in a permeable membrane. As applied to a wet tensiometer cup, it is the air pressure difference required to initiate streaming or bubbling of air through the cup wall.

When a water filled tensiometer is placed in unsaturated soil, the reading of the vacuum gage increases as cup water moves into the soil. When the gage reading equals matric suction, outflow ceases and the gage reading becomes steady. However, as the soil dries further and the vacuum gage reading approaches 0.8 to 0.9 bar, the gage stops rising and the practical limit for the tensiometer is attained. The water that moves out of the cup and into the soil is replaced inside the instrument by a gas phase consisting of water vapor and air, the latter coming either out of solution in the tensiometer water or from leaks in the system. This occurs no matter how high the bubbling pressure of the cup is and is dominated by properties of the bulk water inside the tensiometer.

The soil moisture tensiometer is now widely used as a guide for commercial irrigation. In Monograph No. 5 referred to above, the operating principles for the tensiometer is introduced in chapter 8 and chapter 9 by S. J. Richards is devoted to principles of field use of the tensiometer. Its extreme practical value resides in the fact that it conveniently measures matric suction in the range where the growth rate and yield of most crops can be maximized. It falls short of the original Weather Bureau requirement for a general measuring method because the properties of bulk water in the tensiometer system (dissolved air and water vapor pressure) set an upper limit of about 0.8 bar for its usable matric suction range and also because the ceramic membrane is permeable to soil solution and therefore the tensiometer is essentially unresponsive to solute suction.

A water-sensitive resistor that has long been commercially available is the so-called gypsum block, and a number of patents have been issued on this device. (U.S. Patent 2,740,032 Bouyoucos (1956).) It has been used for relating field water condition to plant growth because the need for an instrument with a wide moisture range has been great and nothing better has been available. Neither manufacturers nor users, however, have published typical or realistic calibration data showing the relation of resistance readings to the energy status of soil water, or the effect of recrystallization or solubility of gypsum on the change, and deterioration of the blocks with time. Other conditions remaining constant, an increase in matric suction of surrounding soil causes an increase in the resistance of gypsum blocks. The response time however is slow. My tests with pressure membrane apparatus show that about a week is required to go from one equilibrium resistance to another at a different matric suction value. More importantly however, the resistance of gypsum blocks decreases if the salinity of the soil solution or the temperature increase. It is clear that if resistance values are used to indicate the need for irrigation, these latter responses are negative or opposite to the desired direction and give a misleading signal.

Other forms of water sensitive resistors for exposure to the liquid phase in soil have been patented (U.S. 3,181,098, L. A. Richards, 1965) and have overcome some of the disadvantages of gypsum blocks, but because of various other stubborn operational deficiencies are not available commercially.

On the basis of present knowledge of the soil-plant-water system as reviewed above it is concluded that a convenient field method for general use in appraising soil water status in relation to crop growth is much needed and is not now available, and that a water vapor measurement for indicating total suction seems to provide the best prospect for such an instrument. This influences toward some form of hygrometer, but in a medium as active and changeable, both biologically and chemically, as soil, this would be difficult without an effective shield because all hygrometers are disabled if the sensitive element gets contaminated. Also the fact that plant roots can function only in a narrow range of humidity near saturation places severe requirements on the sensitivity and equilibrium conditions required for a soil hygrometer and most importantly any shield used must not interfere with the accuracy of the measurement. In other words, the shield must also serve as a membrane that has high permeability to water.

Colligative properties of solutions, such as freezing point depression, boiling point elevation, relative vapor pressure depression $(1-p/p_0)$ and osmotic pressure P are proportional to each other. Between the latter two, to the degree that water vapor is like a perfect gas, we have $1-p/p_0=(v/RT)P$ where $v$ is the partial molar volume of water, R is the gas constant and T is Kelvin temperature. At 25° C. the parentheses has the numerical value $7.3 \times 10^{-4}$. Since the second law of thermodynamics requires that in soil a unit of osmotic pressure (solute suction) produces the same vapor pressure depression as a unit of matric suction, we may insert (TS) in the above equation to denote total suction. Check measurements I have made with pressure-membrane apparatus and thermocouple psychrometers conform to the theory, so we may with confidence write for the above equation $1-p/p_0=7.3\times10^{-4}(TS)$. Taking 15 bars as a reasonable upper soil water suction limit that will permit plant growth and substituting in the equation give $$1-p/p_0=7.3\times10^{-4}\times15=.011$$

converting this to relative humidity gives $$RH=100(p/p_0)=98.9\%$$

In other words, the soil humidity range having agricultural significance extends over about 1% relative humidity next to saturation. This is a range not ordinarily invaded by meteorological hygrometers, but working with soil samples and a thermocouple psychrometer in a constant temperature bath, I have made measurements over the whole plant growth range of soil moisture condition with a precision and accuracy of 0.002% relative humidity (Int'l Symposium on Humidity and Moisture, Washington, D.C., 1964 Proceedings, Reinhold Co., N.Y., pp. 13–18).

Perhaps the most commonly used commercial hygrometer is the water-vapor adsorption type that is calibrated in terms of an electrolytic resistance reading. The symposium proceedings mentioned just above gives methods for making and testing electrolytic absorption hygrometers for meteorological use. Using commercial hygrometric elements of this type that were buried in soil inside a membrane-shield it has been easily possible near saturation to measure reliably relative humidity changes of 0.02 to 0.04%. This is adequate sensitivity for many agricultural purposes. The ease with which acceptable readings are obtained depends in part on the fact that the soil moderates both the rate of temperature change and temperature gradients compared with the usual meteorological or air conditioning exposure of a hygrometer. Furthermore, the energy status of the soil water changes relatively slowly, especially during drying processes, so an extremely short response time is not required.

For preliminary tests I used a thin porous ceramic wall that surrounded and enclosed the hygrometric element. Other materials, having suitable properties that are specified later could of course be used for membrane-shields. Also, I have emphasized the use of my invention for measuring the energy status of water in field soil, but I point out here that hygrometers in a suitable membrane-shield can be used for making in situ water-status measurements in any particled bulk material such as sugar, flour, seed and feed grains, or fertilizer and other hygroscopic bulk chemicals, especially under storage or shipping conditions. Hygrometers thus protected could even be buried in Portland cement because for various purposes in dams, foundations and highways information on the water status in this structural material is of engineering interest.

The "membrane" part of the hyphenated name I use for reference to my invention conforms to the current technical usage that a membrane is mainly a two dimensional entity (thickness is limited) that has differential permeability to adjacent constituents in its environment. The "shield" part of the term suggests both form and mechanical strength to protect the hygrometer from injury and contamination.

The required membrane characteristics can be expressed in general terms. Of first importance is wetability and permeability to water, because the membrane-shield must transmit promptly and accurately the changes in water status or energy condition at its outer surface to its internal surface where the relative humidity (or the relative water vapor pressure depression) can be measured by reading the hygrometer. The membrane must be impermeable to the soil matrix, the soil phase of the soil. I have found that a porous ceramic body with a bubbling pressure of one bar (hydraulic conductivity of $3 \times 10^{-7}$ cm./sec., this is the discharge velocity for water at unit hydraulic gradient and 25° C.) is impermeable to soil particles and also to soil micro-organisms, the latter impermeability being demonstrated by sterile agar-plate tests. Some ceramic bacteriological filters have a bubbling pressure as low as ⅓ bar, so this requirement of impermeability to particulate matter is fully met by ceramic material having a relatively coarse porous structure.

I have made porous ceramic bodies with a bubbling pressure of 15 bars (hydraulic conductivity of $1.5 \times 10^{-8}$ cm./sec.). This material remains saturated in soil over the matric suction range from 0 to 15 bars and seems to be well suited for making membrane-shields for vapor measurements in field soils. It is readily permeable to soil solutions, i.e. it passes the major solute constituents of saline soils. This is true also for the cellulose acetate membranes commonly used for pressure membrane measurements, which have a bubbling pressure up around 150 bars, but the latter do screen out some of the large organic molecules giving rise to the dark color in solutions from sodic soils.

For lack of suitable materials, experimental tests have not been made, but it seems certain from theory that the permeability requirements of membrane-shields to soil solute is indifferent. If the membrane is permeable to solute, solute suction adjustment through the membrane takes place by molecular diffusion of solute through the liquid water in the membrane. If the membrane is impermeable to the solute, the component of water binding by solute in the soil solution, i.e. solute suction at the outer surface of the membrane shield, is transmitted through the water in the membrane by matric suction mechanisms and its component of vapor pressure depression at the inner surface of the membrane-shield is produced by thinner more tightly bound liquid films at the inner air-water interface. It thus appears unnecessary to specify the permeability of membrane-shields to solute and the claims have been so drawn.

As the matric suction increases from 0 to 15 bars, the permeability of soil to liquid (film) flow decreases by a factor of about $10^6$, because the liquid water films become thinner. Concurrently the cross sectional area of the connected gas phase in soil increases and water movement by vapor diffusion becomes relatively more important. As this transition takes place in the soil it will be desirable for a similar transition to take place in the pore system of a membrane-shield. For cases when a short response time for the hygrometer is desirable, it may be advisable to adapt the pore size distribution of the membrane-shield to the pore size distribution of the medium in which the humidity measurement is to be made.

At matric suction values below the bubbling pressure, a membrane-shield is saturated with soil solution and vapor adjustment at the inner surface to change in the matric suction in the immediately exterior soil is accomplished almost instantaneously through the mechanism of change in the thickness of the liquid film at the gas-liquid interface of the inner surface. Solute suction adjustment between the soil solution at the exterior surface of the membrane-shield and the solution at the gas-liquid interface at the inner surface of the membrane-shield takes place by molecular diffusion of solute through the liquid phase in the porous ceramic. When, during calibration tests, the solute suction (osmotic pressure) of a bulk liquid that is in contact with the exterior surface of my membrane-shield is changed from one steady value to another, the response time for a corresponding change in the equilibrium vapor condition at the inner surface is in the range of one to two hours if the ceramic thickness is in the range of one to two millimeters. (By response time here is meant time required for 63% of the total change to occur.) This is negligible compared with periods or cycles of salinity change in field soil that are dominated by irrigation cycles, which are usually of days or weeks duration.

Care must be taken in mounting the hygrometer in the membrane-shield to prevent solute from moving to the sensitive element by film flow or by molecular diffusion through liquid films on supporting structures. This can be effectively done by using coatings of non-absorbent water-repellant materials such as Teflon. Fortunately, the membrane-shield is an effective barrier to mycelial and other growths of soil microorganisms. Once the membrane-shield is closed and sterilized for example by heat or antiseptic chemical vapor, it will remain sterile.

Dew formation gives serious complications for hygrometers that are exposed to high humidities and is an important cause for many meteorological hygrometers not being reliable (or calibrated) in the 90 to 100% RH range. I point out that the porous interior surface of my membrane-shield is essentially free of trouble from dew. If the matric suction is greater than zero, surface droplets will not form, and if they are deposited with a dropper, they quickly spread and disappear into the pores. A temperature difference between two inner surface locations of my membrane-shield produces evaporation at the hot location and condensation at the cold, but matric suction control through the ceramic and soil gives rapid film thickness adjustment. Molecular diffusion overcomes solution concentration gradients occasioned by the vapor condensation and takes place more rapidly than dew evaporation from an impermeable surface which may take hours under high humidity low temperature gradient conditions.

It is my expectation that practically all known types of hygrometers can be miniaturized and adapted for use in my membrane-shield in soil. Some of course may have to be modified for use in the high humidity range. Sensitivity problems should not be troublesome because recent notable advances in portable, electrical instruments now make possible field measurements that a few years ago were not possible even under best laboratory conditions.

It seems likely that the electrical, absorption type hygrometer calibrated in terms of electrolytic resistance when properly mounted in a membrane-shield will provide a soil water sensor that is inexpensive to make and use and may be best suited for use by farmers for scheduling irrigation. It also looks promising as a sensor for automatic irrigation control.

If dew on the hygrometer structures, or hysteresis effects prove troublesome with some types of hygrometers in my soil application, a heating cycle prior to a humidity reading may be necessary so that the hygrometric element is free of dew and always approaches the reading conditions from the dry side. I have incorporated heating elements in some hygrometers I have used, but this is thought not generally to be necessary.

It is anticipated that in addition to insulated electrical wires, one or more small plastic tubes may extend from the interior of the membrane-shield that is buried in the root zone to a convenient instrument reading station at some distance, and above ground. Functions of this tubing, as required, can be: (a) to maintain atmospheric pressure in the gas inside the membrane-shield, for those hygrometers that are sensitive to gas pressure; (b) to maintain, under special circumstances, a gas composition within the membrane-shield that is comparable to the above ground atmosphere or the gas composition extant during calibration; (c) to maintain gas pressure in the membrane-shield above atmospheric pressure to prevent influx of ground water during wet periods when the ground water table may rise above the elevation of the soil hygrometer; (d) to flush the hygrometer parts with distilled water, sterilants or standardizing salines as may be required for normal operation of some hygrometric elements.

Also for those hygrometers whose calibration depends on ambient temperature, extra lead wires will be required for thermocouple or electrical resistance type thermometers. Some of these extras are anticipated by this disclosure but are not shown in the drawings.

Porous ceramic has been mentioned in the discussion and is shown in the drawings as a material suitable for use in making membrane-shields, but my invention is not restricted to the use of any particular membrane material. For example, porous metal having suitable water holding and transmitting properties is available and will be particularly desirable because its higher thermal conductivity will decrease temperature gradients. Its use only awaits the solving of certain fabrication problems.

Summary

A membrane-shield is disclosed for enclosing hygrometers so they can be disposed in a variety of particled materials for measuring the relative humidity therein. The resulting instrument is adaptable to the entire humidity range.

The measurement of the energy status of water in field soil as it relates to the growth and yield of crops is presented as an example to illustrate the usefulness and need for the invention. The background statement reviews the shortcomings of existing commercial soil moisture instruments.

The preferred embodiment describes membrane-shields made from porous ceramic materials and the properties of this material relating to the successful operation of the invention are discussed.

Brief description of the drawing

Reference is now directed to the accompanying drawings in which the same numbers are used to indicate the same parts or structures in the various figures.

Description of a particular embodiment

Figure 1:
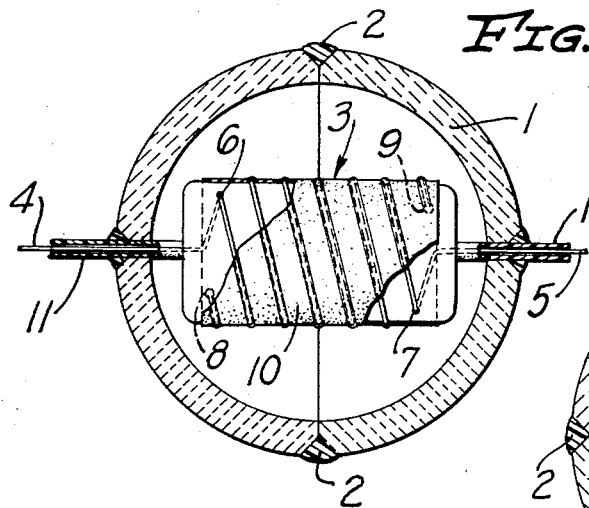
FIGURE 1 is a partially sectional view of a conventional absorption hygrometer element enclosed in a membrane-shield.

To simplify examples of the use of my membrane-shield, the drawings relate only to an absorption hygrometer of a type that is widely available commercially and for which methods of making and calibrating have been published. The hygrometic element consists of a layer of salinized absorptive material that is supported on an impermeable electrically insulating surface and is transected by spaced metallic electrodes. The water content of the absorptive coating depends on ambient relative humidity, which can therefore be related to the electrolytic resistance between the electrodes. It is understood, however, that my invention can be used also with dew-point hygrometers, evaporative cooling hygrometers or any other type that is adaptable to the space and humidity conditions within a membrane-shield in soil.

With the above as introduction, attention is now directed to the several models set forth in the drawings.

FIGURE 1 shows a membrane-shield 1 of spherical shape, made from two halves joined by an external ring of sealant 2, so that the entire inner surface, being porous, is dew free and has a vapor pressure closely approximating water vapor equilibrium with the external soil. The membrane-shields shown in the figures are made of porous ceramic that is highly wettable and permeable to soil solution. The porosity can be in the range from 35 to 70%, and the lower limit for the bubbling pressure can be in the range from 0.4 to 1.0 bar. The diameter of the spherical membrane-shields shown can be in the range from 1.5 to 3.0 or more cm., depending on the size of the hygrometric elements, and the wall thickness of the membrane-shields can be in the range from 0.1 to 0.3 cm., depending on the response time and mechanical strength requirements of particular applications. The cylindrical hygrometric element 3 is shown supported on thin electrical lead wires 4 and 5 that pass outward through the cylinder wall at holes 6 and 7, are wound as separate helices on the outside of the cylinder and are anchored at points 8 and 9. The electrolytically-conducting, water-absorbing layer 10 can be very thin. Typically this can be a hygroscopic water stable coating of material such as partially hydrolyzed polyvinyl acetate having an appropriate content of a deliquescent salt such as lithium chloride. The water content and hence the electrical resistance of this salinized coating is related to ambient humidity. The electrical resistance of the element 10 can be measured by connecting lead wires 4 and 5 to an alternating current Wheatstone bridge or other suitable circuit for measuring resistance. Preferably the read out for such a cicuit can be calibrated directly in terms of relative water vapor pressure depression or total suction. Tubing of water repellant material 11, such as Teflon, prevents salt movement by film flow of soil solution over the lead wires to the sensitive element. Atmospheric pressure inside the membrane-shield for the design in FIGURE 1 is maintained by the gas-flow space between the inside of the Teflon tubing and the lead wires.

Figure 2:
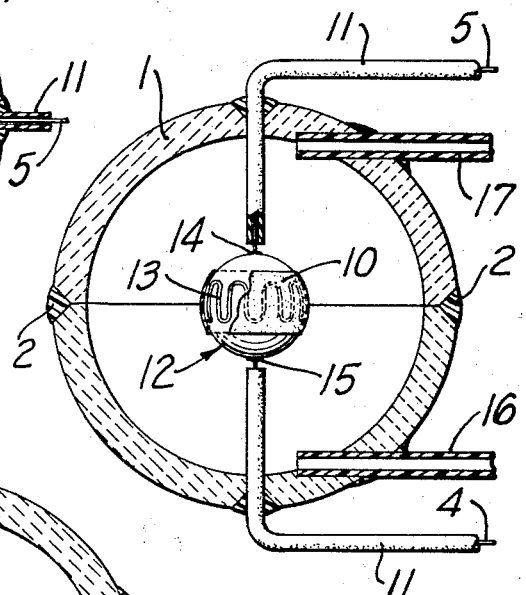
FIGURE 2 is a partially sectional view of a soil hygrometer in a membrane-shield in which spherical symmetry is used, and tubes connecting to the hygrometer chamber are added.

FIGURE 2 is a similar soil hygrometer that approximates spherical symmetry by having the hygrometric element 12 formed on a sphere instead of a cylinder. The surface of this initially electrically insulating sphere is coated with a film of metal, such as platinum, or palladium or nickel, except for a narrow zig-zag band 13 that is metal-free and is coated with the sensitizing water-absorbing layer 10. The lead wires 4 and 5 are shown electrically connected by metal caps 14 and 15 on the metal film and are enclosed in water repellant tubing 11. In addition, small plastic tubes 16 and 17 are shown attached to the bottom and top of the membrane-shield.

Figure 3:
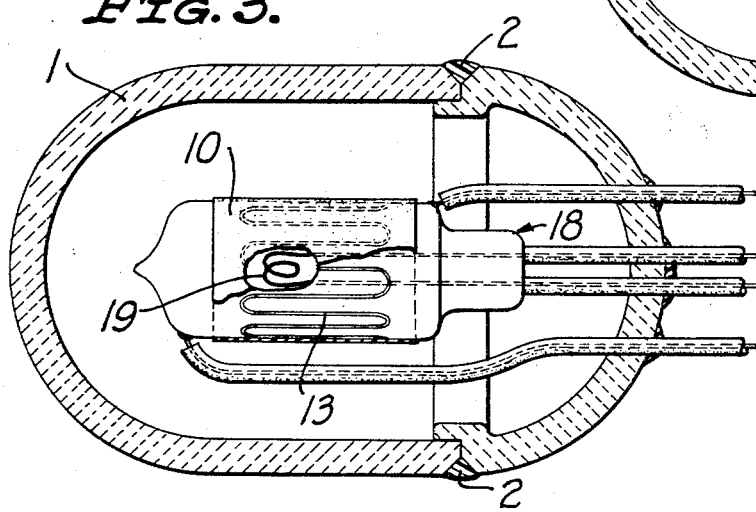
FIGURE 3 is a partially sectional view of a soil hygrometer in which a heating element is incorporated in the hygrometric element.

FIGURE 3 shows a sensitive element 18 making use of a metal film in a manner related to that shown in the preceding figure, except that the supporting surface in this case is a tungsten lamp bulb, the filament of which 19 serves as an electric heater. In soil situations where temperature fluctuation is extreme, the heater permits removing dew from the sensitive element before readings and, where important, also avoids possible hysteresis effects in the relation between humidity and resistance, because the heater makes it possible to take readings only as equilibrium is approached from the dry side.

Figure 4:
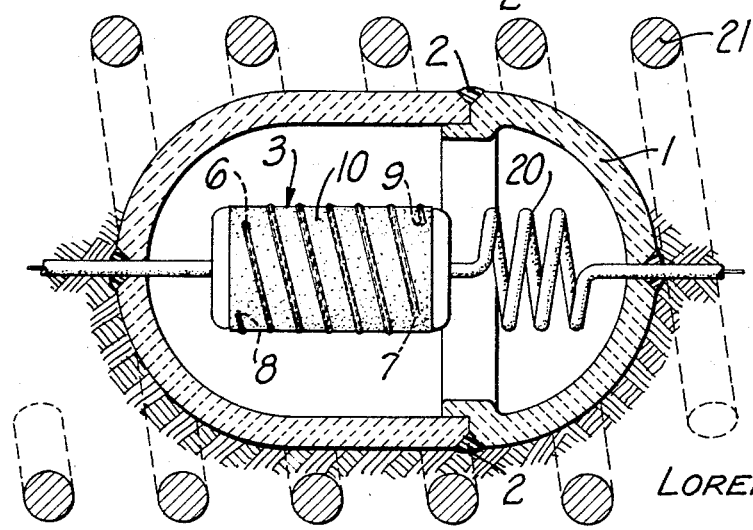
FIGURE 4 is a partially sectional view of a hygrometer buried in soil where a spring suspension is shown and an external metallic helix is used to minimize temperature gradients in the soil.

In FIGURE 4 the sensitive element 3 is the same as in FIGURE 1 except that one lead out wire 20 is a Teflon coated helical spring that keeps the suspension taut and gives some protection from damage by mechanical shock.

In FIGURE 4 also is shown a helix 21 of large diameter wire within which the hygrometer is buried in soil. For installations near the soil surface this helps to minimize vertical temperature gradients.

Although certain embodiments of my invention are shown and described herein, the invention is not to be limited to what has been specifically described.

What is claimed is:

1. An instrument for measuring the energy status of water in field soil or other particulate material, comprising:
    a porous, water-permeable membrane-shield defining a hollow protective container that is adapted to be buried in the soil, said membrane-shield being characterized by high porosity and small pore size, and having a bubbling pressure of not less than about .4 bar, so that bacterial and fungal growths are excluded from the interior thereof;
    said membrane-shield having the physical properties of large specific surface, high permeability to water, and high diffusivity for soil solute over the matric suction range of from 0 to 15 bars, such that the adsorbent tendency of the porous structure of the membrane-shield causes the latter to hold a relatively large amount of water in the form of a continuous liquid phase extending from the exterior surface of the membrane-shield to the interior surface thereof;
    the aqueous vapor pressure depression at the air-water interface on the interior surface of said membrane-shield being a function of the total suction in the surrounding soil as a result of liquid transfer and molecular diffusion of solute in the liquid phase in the membrane-shield, both operating to control the relative humidity of said air-water interface which, in turn, controls the relative humidity of the atmosphere within said membrane-shield; and
    a hygrometer mounted within said membrane-shield, for measuring the relative humidity of the atmosphere therein.

2. An instrument as in claim 1, wherein said hygrometer is supported with respect to said membrane-shield by members having at least the outer surface thereof made of material that is non-adsorbent of moisture and non-wettable thereby, so that liquid film flow and the movement of solute from the membrane-shield to said hygrometer are blocked.

3. An instrument as in claim 2, wherein said hygrometer support members are covered with polytetrafluoroethylene.

4. An instrument as in claim 1, wherein means is provided for heating said hygrometer prior to taking a reading, so to evaporate dew from the surface thereof.

5. An instrument as in claim 1, wherein said membrane-shield is formed of porous, water-permeable ceramic.

6. Apparatus as in claim 1, and
    a spaced configuration of large sized metal wire enclosing said membrane-shield as it is buried in soil to reduce temperature gradients across the instrument, especially when the installation is at shallow depth in the soil.

References Cited

UNITED STATES PATENTS

| | | | |
|---|---|---|---|
| 2,806,991 | 9/1957 | White | 338—34 |
| 2,834,201 | 5/1958 | Ohlheiser | 73—73 |
| 2,870,306 | 1/1959 | Ohlheiser | 73—336 |
| 3,043,133 | 7/1962 | Richards | 73—73 |

LOUIS R. PRINCE, *Primary Examiner.*

D. E. CORR, *Assistant Examiner.*